Nov. 19, 1968    M. ZIEGLER    3,411,756
MIXING DEVICE FOR FLUIDS
Filed Sept. 11, 1967
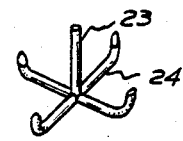
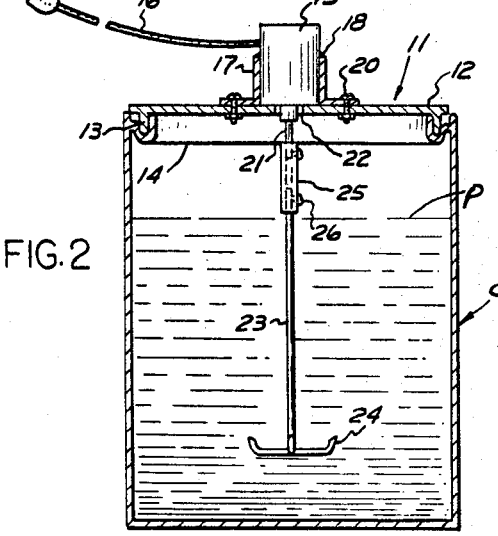
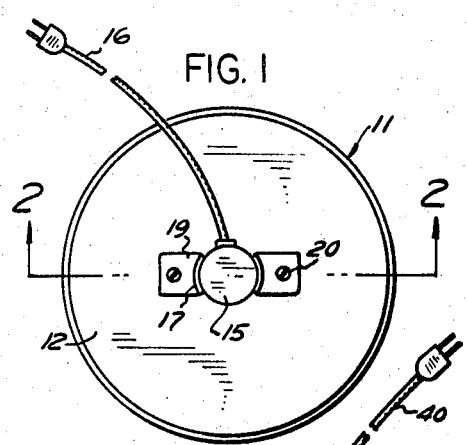
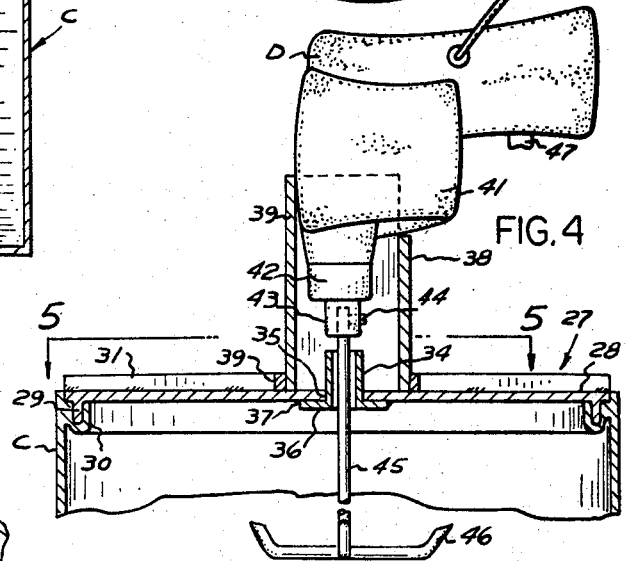
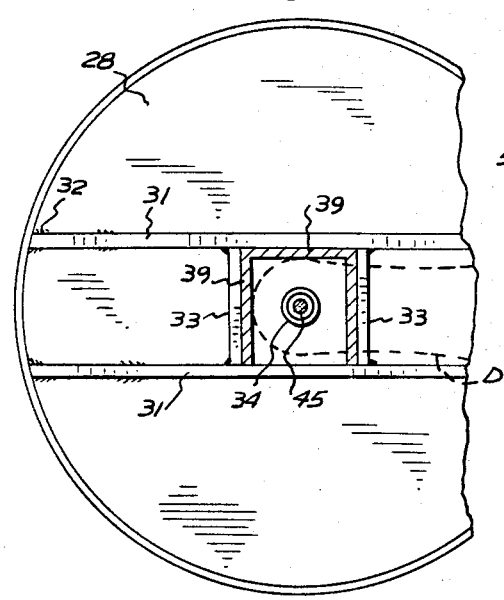
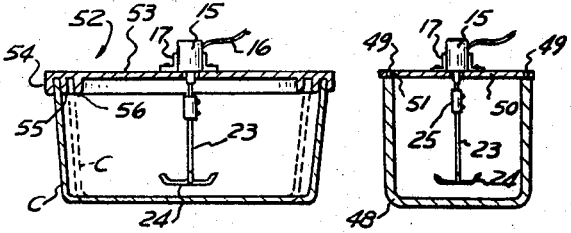
INVENTOR
MOSES ZIEGLER
BY Cullen, Sloman, & Cantor
ATTORNEYS

United States Patent Office 3,411,756
Patented Nov. 19, 1968

3,411,756
MIXING DEVICE FOR FLUIDS
Moses Ziegler, 12638 Roselawn,
Detroit, Mich. 48238
Filed Sept. 11, 1967, Ser. No. 666,752
2 Claims. (Cl. 259—122)

ABSTRACT OF THE DISCLOSURE

A mixer for fluids stored in a cylindrical open container, which includes an adapter plate selectively mountable upon such container and interlocked therewith, and an electric motor mounted on said plate with interconnected drive shaft and paddle mixer thereon.

---

The present invention relates to a mixing device for fluids, including paints, chemicals and foods stored in a container having an open top.

Brief description

It is an object of the present invention to provide a mixing device which is in the nature of an adapter plate which may be removably mounted upon any container, as for example a gallon container of paint, a five gallon container of paint, or a food mixing bowl, or other container containing fluids to be mixed or other particles, and wherein a power means is mountable upon or secured to the adapter plate or cover and wherein a driven shaft mounting a paddle blade is connected to the said motor to thus provide a very convenient means for mixing any of such fluids selectively.

It is another object of the present invention to provide a simple and inexpensive adapter mixing device particularly adapted for fitting containers whose covers have been removed, and wherein the power means is either attached to the adapter cover fixedly or removably connected thereto for driving a paddle shaft with paddle for a mixing operation.

It is another object to provide an adapter plate assembly mountable upon the open end of a container, and wherein there is employed the conventional type of power drill to which has been connected a shaft mounting a paddle blade for a mixing operation requiring a minimum number of parts and assembly for the intended purpose.

It is another object to provide an adapter type of plate with plural means upon its undersurface for interlock with one or more containers having upper open ends of different diameter.

These and other objects will be seen from the following specification and claims in conjunction with the appended drawing in which:

FIG. 1 is a plan view of the present mixing device as mounted upon a container having an open top.

FIG. 2 is a fragmentary partially broken away section taken in the direction of arrows 2—2 of FIGURE 1.

FIG. 3 is a fragmentary perspective view of the paddle mixer shown in FIGURE 2.

FIG. 4 is a fragmentary sectional view of a modified mixing device incorporating a power drill.

FIG. 5 is a fragmentary plan section taken in the direction of arrows 5—5 of FIGURE 4.

FIG. 6 is an elevational section of a modified mixer.

FIG. 7 is a similar view of another modification.

It will be understood that the above drawing illustrates merely several preferred embodiments of the invention, and that other embodiments are contemplated within the scope of the claims hereafter set forth.

Referring to the drawing, FIGURES 1, 2, and 3, the present mixing device generally indicated at 11, includes adapter plate 12 of circular shape and which incorporates some form of retaining means upon one surface thereof, adapted to overly and cooperatively register with the upper open end of container C. In the illustration, FIGURE 2, the said retaining means is in the form of an annular bead 13, which depends from one surface of plate 12 inwardly of its periphery and is adapted for cooperative registry within the conventional annular channel 14 upon the interior upper open end of said container.

Electric motor 15 with suitable plug-in cord 16 is nested within the tubular bracket 17 and welded or otherwise secured thereto at 18. Said bracket includes outturned legs 19 which overlie and are secured to the top of plate 12, as by fasteners 20.

Motor 15 includes a conventional drive shaft 21 which projects through an axial aperture 22 in plate 12, and is axially alined with and connected to shaft 23 mounting paddle mixer 24, FIGURE 3.

The coupling includes the coupling sleeve 25 connected adjacent its opposite ends by the fastening means 26 to the respective shafts 21 and 23 to complete this assembly.

The fluid, such as paint or a chemical or a food is designated at P, FIGURE 2, the said shaft and paddle mixer 24 being projected down into said fluid for a power mixing of same upon application of the said adapter plate assembly over the upper open end of the container.

In the illustrative embodiment, for illustration, a container C is in the form of a one gallon paint can, which is reasonably uniform in dimension, particularly at its upper open end, and accordingly the present mixing device 11, and its adapter plate 12 may be applied to any such gallon type of container for the mixing of paints so that the mixing device may be moved from one container to another as desired for the intended purpose.

A modification is shown in FIGURES 4 and 5, wherein in the illustration the container happens to represent a five gallon paint can, or other container with fluids to be mixed, the said mixing device being generally indicated at 27.

Said mixer includes adapter plate 28 of circular form and projecting from one side thereof the annular bead 29 adapted for normal nesting and retaining interlocked within a corresponding channel 30, upon the upper open end of said container.

The upper surface of plate 28 has applied thereto a pair of parallel reinforcing ribs 31 welded thereto as at points 32, and including a pair of transverse interconnected ribs or cross-ribs 33.

Within the central portion, defined by said ribs and cross-ribs, there is provided an elongated guide sleeve 38, which is secured centrally upon plate 28 as by welding, being arranged on the side of said plate opposite from bead 29.

The guide bushing 34 is nested within the sleeve 38 and is projected axially through plate 28 and secured thereto.

In the illustration shown in FIGURE 4, the securing including an integral washer or flange 36 upon the lower end of bushing 34 which bears against the undersurface of plate 28 and is fixedly secured thereto as by welds at 37. A conventional power cord with connected plug is fragmentarily shown at 40 and projecting from the housing D of a power drill which encloses a conventional electric motor whose housing 41 includes the shank 42, mounting a suitable conventional electric motor and connected spindle 43 in axial alinement with bushing 34.

Elongated axial shaft 45 projects loosely through the bushing 34 and is secured within spindle 43 by suitable fastener or set screw 44, said shaft mounting a conventional paddle mixer 46 with a construction similar to that shown in FIGURE 3 for illustration. A suitable conventional switch 47 is applied to the power drill as at 41 for activating the power drill assembly as desired.

In use the power drill assembly, including the housing 41 is projected axially down into the guide sleeve 38 and into cooperative interlocking registry with the right angular stop projections 39, FIGURES 4 and 5, to thus retain the power drill housing 41 relatively stationary when activated and thus not requiring manual holding, once the power drill assembly has been mounted as positioned and the paddle shaft 45 projected up through the bushing 34 and secured to the spindle 43 to complete the construction.

Thus, there is provided as shown in FIGURES 4 and 5, a mixing device which includes the adapter plate 28 which in the illustrative embodiment may be selectively and replaceably mounted upon an open top container C, such as a five gallon paint can, and wherein a conventional power drill assembly D may be employed, and with the paddle shaft 45 projected up through the mixer assembly 27 and interlocked and connected with the driven spindle 43, forming a part of the power drill. By this construction thus the mixing assembly may or may not include as an integral part thereof the power drill, which can be supplied by the owner of such drill, which can thus be adapted to the mixing operation merely by attaching the said spindle 43 to a paddle shaft 45, and using the present adapter plate 28.

A modification as shown in FIGURE 7, wherein the illustrative container 48 is in the nature of a mixing bowl for foods for illustration, but not limited thereto. This mixing bowl includes an upper open end from which projects a pair of opposed spaced pins 49 adapted for cooperative projection and registry within corresponding apertures 51 through the adapter plate 50 to thus provide a cooperative retaining means between the said adapter plate and the upper open end of the container.

The remainder of the construction corresponds substantially to FIGURE 2, wherein a conventional electric motor 15 is mounted by a suitable bracket 17 and secured upon the top of adapter plate 50, and axially thereof is provided a corresponding shaft 23 mounting paddle mixer 24, the said shaft being coupled to the driving means from the said motor by a suitable coupling 25 as above described.

A further modification is shown in FIGURE 6, said mixer assembly being generally indicated at 52 and including a modified form of adapter plate 53.

This plate upon one side has projecting therefrom a plurality of annular spaced beads 54, 55, and 56. The outer pair of beads define a first channel adapted to cooperatively receive the upper open edge of the container C shown in solid lines for suitable interlock therewith.

Here also as in FIGURE 7, there is provided a conventional electric motor 15 with assembled shaft and paddle mixer 24.

The inner pair of beads 55, 56 define an additional annular channel adapted to receive the upper open end of a secondary container of reduced dimension as indicated at C, but shown in dotted lines to thus illustrative the versatility and adaptability of the present mixing device for multiplicity of usages.

Having described my invention, reference should now be had to the following claims. I claim:

1. In a mixing device for fluids, including paints, chemicals, and foods stored in a container having an open top, the improvement comprising:
   an adapter plate of circular shape;
   retaining means on said plate adapted to overlie and for cooperative registry with said container;
   an electric motor mounted on said plate including drive means projecting therefrom;
   an elongated shaft aligned with said drive means;
   a paddle mixer on one end of said shaft;
   and means axially coupling said shaft to said drive means, the mounting of said motor including a guide sleeve secured centrally upon said plate and projecting therefrom;
   a bushing within said sleeve extending axially through and secured to said plate;
   said motor being enclosed within an electric hand drill housing loosely mounted upon and projected into said sleeve;
   said shaft loosely journaled through said bushing.

2. In the mixing device of claim 1, notched retaining means projecting from said sleeve registrable with said drill housing to prevent relative rotation thereof.

References Cited

UNITED STATES PATENTS

| | | | |
|---|---|---|---|
| 887,668 | 5/1908 | Linney | 259—103 XR |
| 1,282,148 | 10/1918 | Tripke | 259—117 |
| 2,250,142 | 7/1941 | Umstead | 259—122 XR |
| 2,661,193 | 12/1953 | Silver | 259—122 XR |
| 2,736,536 | 2/1956 | Banowitz | 259—122 |
| 2,913,230 | 11/1959 | Hutchins | 259—108 |
| 3,021,118 | 2/1962 | Dedoes | 259—122 XR |
| 3,158,360 | 11/1964 | Dunn | 259—135 |

WILLIAM I. PRICE, *Primary Examiner.*

J. M. BELL, *Assistant Examiner.*